US008335637B2

(12) United States Patent
Deurwaarder et al.

(10) Patent No.: US 8,335,637 B2
(45) Date of Patent: *Dec. 18, 2012

(54) NAVIGATION DEVICE AND METHOD PROVIDING A TRAFFIC MESSAGE CHANNEL RESOURCE

(75) Inventors: William Deurwaarder, Rotterdam (NL); Erik Thomassen, Delft (NL); Henny Verwaij, Amsterdam (NL); Barbara Laermann, Munich (DE)

(73) Assignee: Tomtom International B.V., Amsterdam (NL)

(*) Notice: Subject to any disclaimer, the term of this patent is extended or adjusted under 35 U.S.C. 154(b) by 1314 days.

This patent is subject to a terminal disclaimer.

(21) Appl. No.: 11/907,252

(22) Filed: Oct. 10, 2007

(65) Prior Publication Data

US 2008/0221782 A1 Sep. 11, 2008

Related U.S. Application Data

(60) Provisional application No. 60/879,523, filed on Jan. 10, 2007, provisional application No. 60/879,549, filed on Jan. 10, 2007, provisional application No. 60/879,553, filed on Jan. 10, 2007, provisional application No. 60/879,577, filed on Jan. 10, 2007, provisional application No. 60/879,599, filed on Jan. 10, 2007.

(51) Int. Cl.
*G08G 1/00* (2006.01)

(52) U.S. Cl. ............ 701/117; 701/1; 701/118; 701/120; 701/301; 340/990; 340/961; 340/905; 340/993; 340/995.13; 342/29; 342/455; 342/457; 342/453; 342/456; 370/335; 370/342; 370/347; 370/401; 455/186.1

(58) Field of Classification Search .............. 701/1, 117, 701/118, 207, 208, 120, 213, 301; 340/825.49, 340/961, 905, 993, 995.13, 990; 342/29, 342/455, 457, 453, 456, 36; 370/335, 342, 370/347, 401; 455/186.1
See application file for complete search history.

(56) References Cited

U.S. PATENT DOCUMENTS 5,355,526 A * 10/1994 Berninger ................. 455/161.2
(Continued)

FOREIGN PATENT DOCUMENTS

DE 44 42 413 5/1996
(Continued)

OTHER PUBLICATIONS

U.S. Office Action mailed Apr. 27, 2010 for co-pending U.S. Appl. No. 11/907,253.

(Continued)

*Primary Examiner* — James Trammell
*Assistant Examiner* — McDieunel Marc (57) ABSTRACT

A method and a navigation device are disclosed for sharing at least one location message with at least one other device. The navigation device includes a receiver to determine a signal strength of a traffic message channel at a location, a memory to store information representing the signal strength of a traffic message channel, and at least one processor to correlate the information stored in memory to compile a traffic message channel resource and select a traffic message channel based on the traffic message channel resource and a location associated with a navigation device. The method includes determining a signal strength of a traffic message channel at a location, storing information representing the signal strength of a traffic message channel, correlating the information stored in memory to compile a traffic message channel resource, and selecting a traffic message channel based on the traffic message channel resource and a location associated with a navigation device.

14 Claims, 7 Drawing Sheets

U.S. PATENT DOCUMENTS

| | | | |
|---|---|---|---|
| 5,428,825 | A | 6/1995 | Tomohiro et al. |
| 5,603,108 | A * | 2/1997 | Thoone .................. 455/186.1 |
| 6,035,207 | A * | 3/2000 | Wang et al. .................. 455/509 |
| 6,085,146 | A | 7/2000 | Kuribayashi et al. |
| 7,145,479 | B2 * | 12/2006 | Fastenrath ............... 340/995.13 |
| 7,289,904 | B2 * | 10/2007 | Uyeki ........................ 701/209 |
| 7,307,513 | B2 * | 12/2007 | Shutter et al. ............ 340/995.13 |
| 7,366,606 | B2 * | 4/2008 | Uyeki ........................ 701/117 |
| 7,516,012 | B2 * | 4/2009 | Piekarz et al. ............... 701/213 |
| 7,562,049 | B2 * | 7/2009 | Habaguchi .................... 705/40 |
| 7,630,328 | B2 * | 12/2009 | Wright et al. ............... 370/260 |
| 7,668,653 | B2 * | 2/2010 | Habaguchi ................... 701/209 |
| 7,783,471 | B2 * | 8/2010 | Vismans et al. ............... 703/26 |
| 7,817,600 | B2 * | 10/2010 | Lee et al. ..................... 370/331 |
| 7,818,380 | B2 * | 10/2010 | Tamura et al. ............... 709/206 |
| 7,974,777 | B2 * | 7/2011 | Deurwaarder et al. ....... 701/202 |
| 2002/0160745 | A1 | 10/2002 | Wang |
| 2003/0231208 | A1 | 12/2003 | Hanon et al. |
| 2006/0068700 | A1 | 3/2006 | Habaguchi et al. |
| 2006/0121868 | A1 | 6/2006 | Jutori |
| 2006/0199569 | A1 | 9/2006 | Lien |
| 2006/0212213 | A1 | 9/2006 | Piekarz |
| 2007/0006272 | A1 | 1/2007 | Kikkoji et al. |
| 2007/0027611 | A1 | 2/2007 | Piekarz |
| 2007/0038373 | A1 | 2/2007 | Chen |
| 2007/0052597 | A1 | 3/2007 | Piekarz |
| 2007/0118281 | A1 | 5/2007 | Adam et al. |
| 2007/0124070 | A1 | 5/2007 | Kawai et al. |
| 2007/0202930 | A1 * | 8/2007 | Cao et al. ..................... 455/570 |
| 2007/0210938 | A1 * | 9/2007 | Deurwaarder et al. .. 340/995.21 |
| 2007/0239846 | A1 * | 10/2007 | Kehdra et al. ................ 709/217 |
| 2007/0265769 | A1 * | 11/2007 | Geelen et al. ................. 701/200 |
| 2007/0265774 | A1 * | 11/2007 | Deurwaarder et al. ....... 701/211 |
| 2007/0266191 | A1 * | 11/2007 | Schnepp et al. .............. 710/264 |
| 2007/0288155 | A1 | 12/2007 | Kaneda |
| 2008/0119222 | A1 | 5/2008 | Piekarz |
| 2008/0177471 | A1 * | 7/2008 | Deurwaarder et al. ....... 701/210 |
| 2008/0215236 | A1 * | 9/2008 | Deurwaarder et al. ....... 701/202 |

FOREIGN PATENT DOCUMENTS

| | | |
|---|---|---|
| DE | 197 10 863 | 9/1998 |
| EP | 0 866 576 | 9/1998 |
| EP | 0874344 | 10/1998 |
| EP | 0 901 248 | 3/1999 |
| EP | 1 148641 | 10/2001 |
| EP | 1 475 909 | 11/2004 |
| GB | 2 434 931 | 8/2007 |

OTHER PUBLICATIONS

US Office Action mailed Apr. 27, 2010 for co-pending U.S. Appl. No. 11/907,253.

US Office Action mailed Jul. 14, 2009 for co-pending U.S. Appl. No. 11/907,253.

International Search Report issued on Jun. 30, 2008 for International Application No. PCT/EP2007/008750.

International Search Report issued on Mar. 14, 2008 for International Application No. PCT/EP2007/008762.

International Preliminary Report on Patentability and Written Opinion of the International Search Authority issued on Jul. 14, 2009 for International Application No. PCT/EP2007/008762.

* cited by examiner

NAVIGATION DEVICE AND METHOD PROVIDING A TRAFFIC MESSAGE CHANNEL RESOURCE

CO-PENDING APPLICATIONS

The following applications are being filed concurrently with the present application. The entire contents of each of the following applications is hereby incorporated herein by reference: A NAVIGATION DEVICE AND METHOD FOR EARLY INSTRUCTION OUTPUT (application Ser. No. 11/907,229) filed on even date herewith; A NAVIGATION DEVICE AND METHOD FOR ESTABLISHING AND USING PROFILES (application Ser. No. 11/907,230) filed on even date herewith; A NAVIGATION DEVICE AND METHOD FOR ENHANCED MAP DISPLAY (application Ser. No. 11/907,231) filed on even date herewith; A NAVIGATION DEVICE AND METHOD RELATING TO AN AUDIBLE RECOGNITION MODE (application Ser. No. 11/907,232) filed on even date herewith; NAVIGATION DEVICE AND METHOD FOR PROVIDING POINTS OF INTEREST (application Ser. No. 11,907,233) filed on even date herewith; A NAVIGATION DEVICE AND METHOD FOR FUEL PRICING DISPLAY (application Ser. No. 11/907,234) filed on even date herewith; A NAVIGATION DEVICE AND METHOD FOR INFORMATIONAL SCREEN DISPLAY (application Ser. No. 11/907,235) filed on even date herewith; A NAVIGATION DEVICE AND METHOD FOR DEALING WITH LIMITED ACCESS ROADS (application Ser. No. 11/907,243) filed on even date herewith; A NAVIGATION DEVICE AND METHOD FOR TRAVEL WARNINGS (application Ser. No. 11/907,244) filed on even date herewith; A NAVIGATION DEVICE AND METHOD FOR DRIVING BREAK WARNING (application Ser. No. 11/907,227) filed on even date herewith; A NAVIGATION DEVICE AND METHOD FOR ISSUING WARNINGS (application Ser. No. 11/907,242) filed on even date herewith; A NAVIGATION DEVICE AND METHOD FOR DISPLAY OF POSITION IN TEXT READIBLE FORM (application Ser. No. 11/907,241) filed on even date herewith; A NAVIGATION DEVICE AND METHOD FOR EMERGENCY SERVICE ACCESS (application Ser. No. 11/907,228) filed on even date herewith; A NAVIGATION DEVICE AND METHOD FOR PROVIDING REGIONAL TRAVEL INFORMATION IN A NAVIGATION DEVICE (application Ser. No. 11/907,240) filed on even date herewith; A NAVIGATION DEVICE AND METHOD FOR USING SPECIAL CHARACTERS IN A NAVIGATION DEVICE (application Ser. No. 11/907,239) filed on even date herewith; A NAVIGATION DEVICE AND METHOD USING A PERSONAL AREA NETWORK (application Ser. No. 11/907,238) filed on even date herewith; A NAVIGATION DEVICE AND METHOD USING A LOCATION MESSAGE (application Ser. No. 11/907,237) filed on even date herewith; A NAVIGATION DEVICE AND METHOD FOR CONSERVING POWER (application Ser. No. 11/907,236) filed on even date herewith; A NAVIGATION DEVICE AND METHOD FOR USING A TRAFFIC MESSAGE CHANNEL (application Ser. No. 11/907,252) filed on even date herewith; A NAVIGATION DEVICE AND METHOD FOR QUICK OPTION ACCESS (application Ser. No. 11/907,251) filed on even date herewith; A NAVIGATION DEVICE AND METHOD FOR DISPLAYING A RICH CONTENT DOCUMENT (application Ser. No. 11/907,257) filed on even date herewith.

PRIORITY STATEMENT

The present application hereby claims priority under 35 U.S.C. §119(e) on each of U.S. Provisional Patent Application Nos. 60/879,523 filed Jan. 10, 2007; 60/879,549 filed Jan. 10, 2007; 60/879,553 filed Jan. 10, 2007; 60/879,577 filed Jan. 10, 2007; and 60/879,599 filed Jan. 10, 2007; the entire contents of each of which is hereby incorporated herein by reference.

FIELD

The present application generally relates to navigation methods and devices.

BACKGROUND

Navigation devices were traditionally utilized mainly in the areas of vehicle use, such as on cars, motorcycles, trucks, boats, etc. Alternatively, if such navigation devices were portable, they were further transferable between vehicles and/or useable outside the vehicle, for foot travel for example.

These devices provide a user with directions and map information to direct the user from one location to another location. These devices can also provide traffic information through a traffic message channel by scanning traffic message channels and choosing a traffic message channel with the strongest signal.

SUMMARY

In at least one embodiment of the present application, a navigation device includes a receiver to determine a signal strength of a traffic message channel at a location, a memory to store information representing the signal strength of a traffic message channel, and at least one processor to correlate the information stored in memory to compile a traffic message channel resource and select a traffic message channel based on the traffic message channel resource and a location associated with a navigation device.

In at least one embodiment of the present application, a navigation device includes an input device to receive information relating to multiple traffic message channels from each traffic message channel providers and a processor to create a traffic message channel resource from the information. The traffic message channel resource designates at least one preferred traffic message channel for multiple locations in a coverage area.

In at least one embodiment of the present application, a method includes determining a signal strength of a traffic message channel at a location, storing information representing the signal strength of a traffic message channel, correlating the information stored in memory to compile a traffic message channel resource; and selecting a traffic message channel based on the traffic message channel resource and a location associated with a navigation device.

In at least one embodiment of the present application, a method includes receiving information relating to multiple traffic message channels from each traffic message channel providers, and creating a traffic message channel resource from the information. The traffic message channel resource designates at least one preferred traffic message channel for multiple locations in a coverage area.

In at least one embodiment of the present application, a navigation device includes means for measuring a signal strength of a traffic message channel, means for storing information representing the signal strength of a traffic message channel at the location of a navigation device, means for correlating the information stored in memory to compile a traffic message channel resource, and means for selecting a traffic message channel based on the traffic message channel resource and a current location of a navigation device.

In at least one embodiment of the present application, a navigation device includes means for receiving information relating to multiple traffic message channels from each traffic message channel providers and means for creating a traffic message channel resource from the information. The traffic message channel resource designates at least one preferred traffic message channel for multiple locations in a coverage area.

BRIEF DESCRIPTION OF THE DRAWINGS

The present application will be described in more detail below by using example embodiments, which will be explained with the aid of the drawings, in which.

DETAILED DESCRIPTION OF THE EXAMPLE EMBODIMENTS

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the term "and/or" includes any and all combinations of one or more of the associated listed items.

Figure 1:
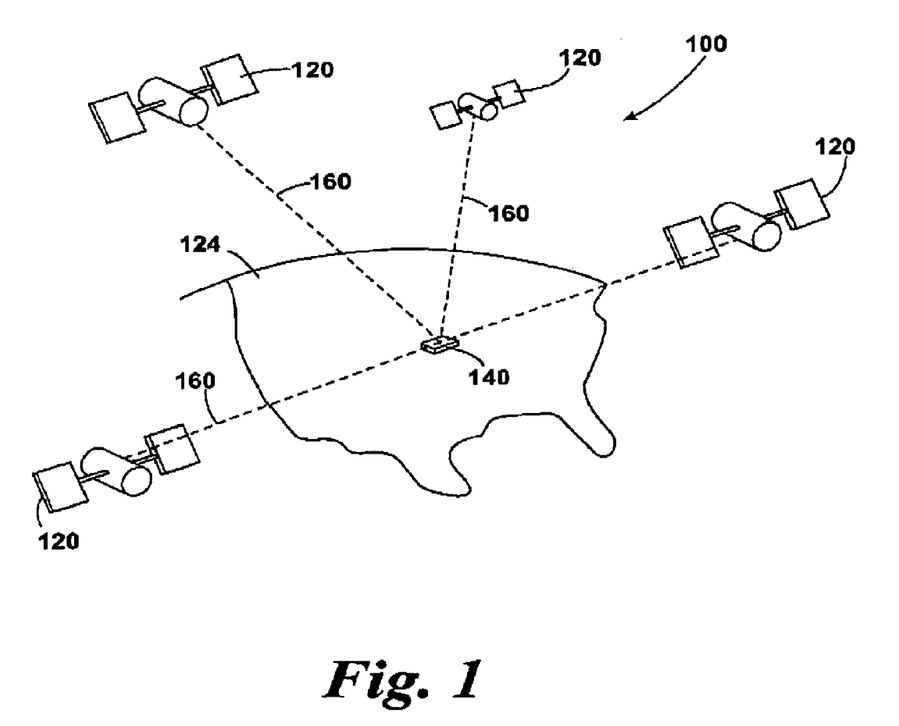
FIG. 1 illustrates an example view of a Global Positioning System (GPS)

FIG. 1 illustrates an example view of Global Positioning System (GPS), usable by navigation devices, including the navigation device of embodiments of the present application. Such systems are known and are used for a variety of purposes. In general, GPS is a satellite-radio based navigation system capable of determining continuous position, velocity, time, and in some instances direction information for an unlimited number of users.

Formerly known as NAVSTAR, the GPS incorporates a plurality of satellites which work with the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140, usable in embodiments of navigation devices of the present application, is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
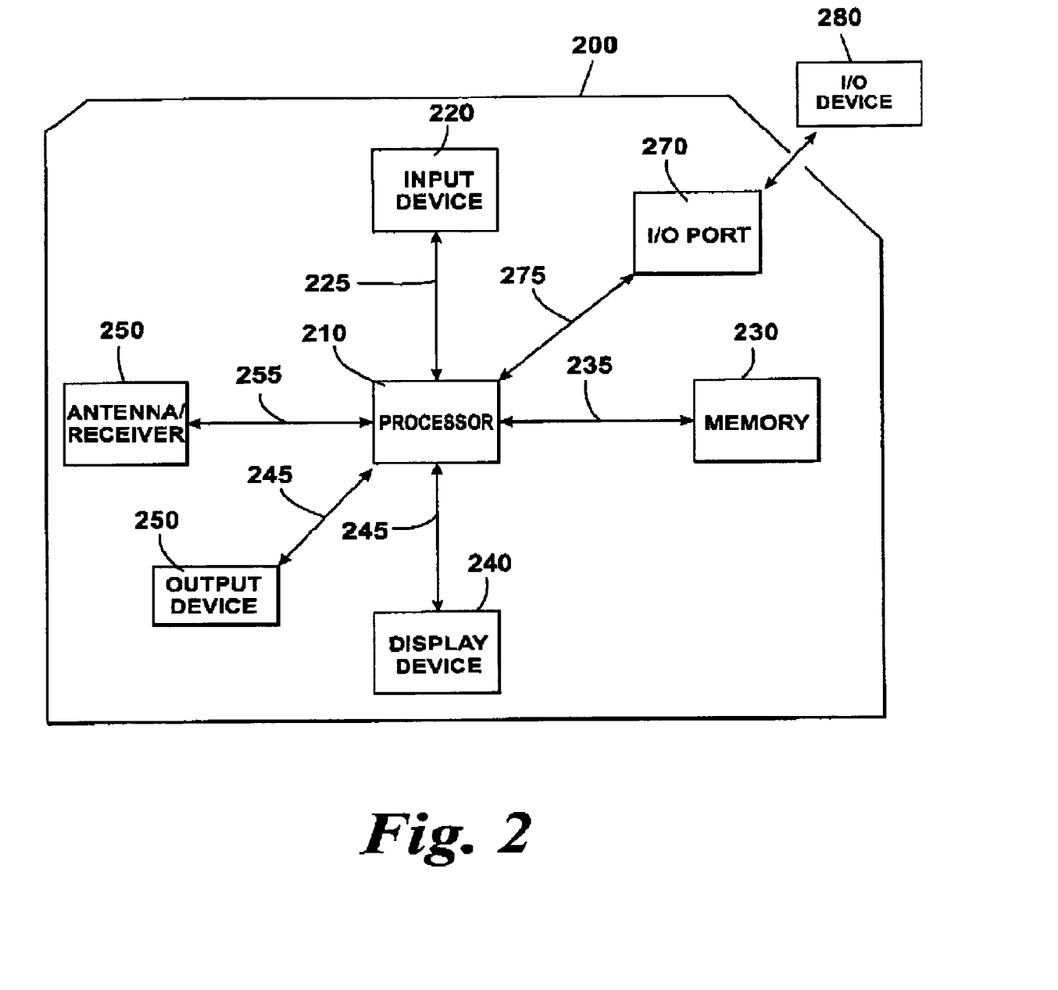
FIG. 2 illustrates an example block diagram of electronic components of a navigation device of an embodiment of the present application.

FIG. 2 illustrates an example block diagram of electronic components of a navigation device 200 of an embodiment of the present application, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilized to input information; and the display screen 240 can include any type of display screen such as an LCD display, for example. In at least one embodiment of the present application, the input device 220 and display screen 240 are integrated into an integrated input and display device, including a touchpad or touchscreen input wherein a user need only touch a portion of the display screen 240 to select one of a plurality of display choices or to activate one of a plurality of virtual buttons.

In addition, other types of output devices 250 can also include, including but not limited to, an audible output device. As output device 250 can produce audible information to a user of the navigation device 200, it is equally understood that input device 240 can also include a microphone and software for receiving input voice commands as well.

In the navigation device 200, processor 210 is operatively connected to and set to receive input information from input device 240 via a connection 225, and operatively connected to at least one of display screen 240 and output device 250, via output connections 245, to output information thereto. Further, the processor 210 is operatively connected to memory 230 via connection 235 and is further adapted to receive/send information from/to input/output (I/O) ports 270 via connection 275, wherein the I/O port 270 is connectible to an I/O device 280 external to the navigation device 200. The external I/O device 270 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

The navigation device 200, in at least one embodiment, may establish a "mobile" network connection with the server 302 via a mobile device (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using the internet for example, can be done in a known manner. This can include use of TCP/IP layered protocol for example. The mobile device can utilize any number of communication standards such as CDMA, GSM, WAN, etc.

As such, an internet connection may be utilized which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet.

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, wherein the internal antenna of the navigation device 200 can further alternatively be used). The mobile phone technology within the navigation device 200 can include internal components as specified above, and/or can include an insertable card, complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, the Bluetooth enabled device may be used to correctly work with the ever changing spectrum of mobile phone models, manufacturers, etc., model/manufacturer specific settings may be stored on the navigation device 200 for example. The data stored for this information can be updated in a manner discussed in any of the embodiments, previous and subsequent.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna, a helical antenna, or a traffic message channel antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered within the scope of the present application. For example, in one embodiment, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a motorized vehicle such as a car or boat for example. Such a navigation device 200 is then removable from the docked location for portable or handheld navigation use.

Figure 3:
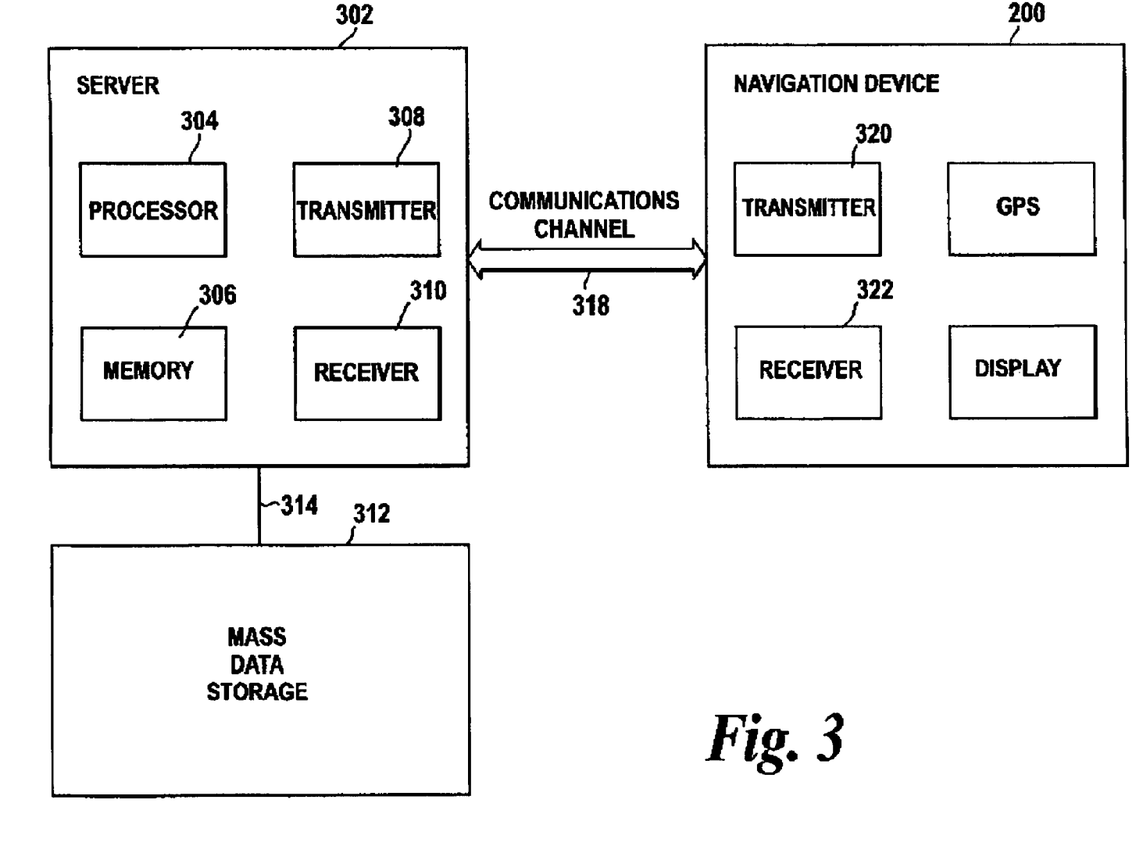
FIG. 3 illustrates an example block diagram of a server, navigation device and connection therebetween of an embodiment of the present application.

FIG. 3 illustrates an example block diagram of a server 302 and a navigation device 200 of the present application, via a generic communications channel 318, of an embodiment of the present application. The server 302 and a navigation device 200 of the present application can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. According to at least one embodiment of the present application, another service provided by the server 302 includes processing the navigation data using various algorithms for a desired application and sending the results of these calculations to the navigation device 200.

The communication channel 318 generically represents the propagating medium or path that connects the navigation device 200 and the server 302. According to at least one embodiment of the present application, both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, according to at least one embodiment, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fiber optic cables, converters, radio-frequency (rf) waves, the atmosphere, empty space, etc. Furthermore, according to at least one various embodiment, the communication channel 318 can include intermediate devices such as routers, repeaters, buffers, transmitters, and receivers, for example.

In at least one embodiment of the present application, for example, the communication channel 318 includes telephone and computer networks. Furthermore, in at least one embodiment, the communication channel 318 may be capable of accommodating wireless communication such as radio frequency, microwave frequency, infrared communication, etc.

Additionally, according to at least one embodiment, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. According to at least one embodiment, these signals may be modulated, encrypted and/or compressed signals as may be desirable for the communication technology.

The mass data storage 312 includes sufficient memory for the desired navigation applications. Examples of the mass data storage 312 may include magnetic data storage media such as hard drives for example, optical storage media such as CD-Roms for example, charged data storage media such as flash memory for example, molecular memory, etc.

According to at least one embodiment of the present application, the server 302 includes a remote server accessible by the navigation device 200 via a wireless channel. According to at least one other embodiment of the application, the server 302 may include a network server located on a local area network (LAN), wide area network (WAN), virtual private network (VPN), etc.

According to at least one embodiment of the present application, the server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

The mass storage device 312 connected to the server 302 can include volumes more cartographic and route data than that which is able to be maintained on the navigation device 200 itself, including maps, etc. The server 302 may process, for example, the majority of the devices of a navigation device 200 which travel along the route using a set of processing algorithms. Further, the cartographic and route data stored in memory 312 can operate on signals (e.g. GPS signals), originally received by the navigation device 200.

As indicated above in FIG. 2 of the application, a navigation device 200 of an embodiment of the present application includes a processor 210, an input device 220, and a display screen 240. In at least one embodiment, the input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 240, such as audio input/output devices for example.

Figure 4A:
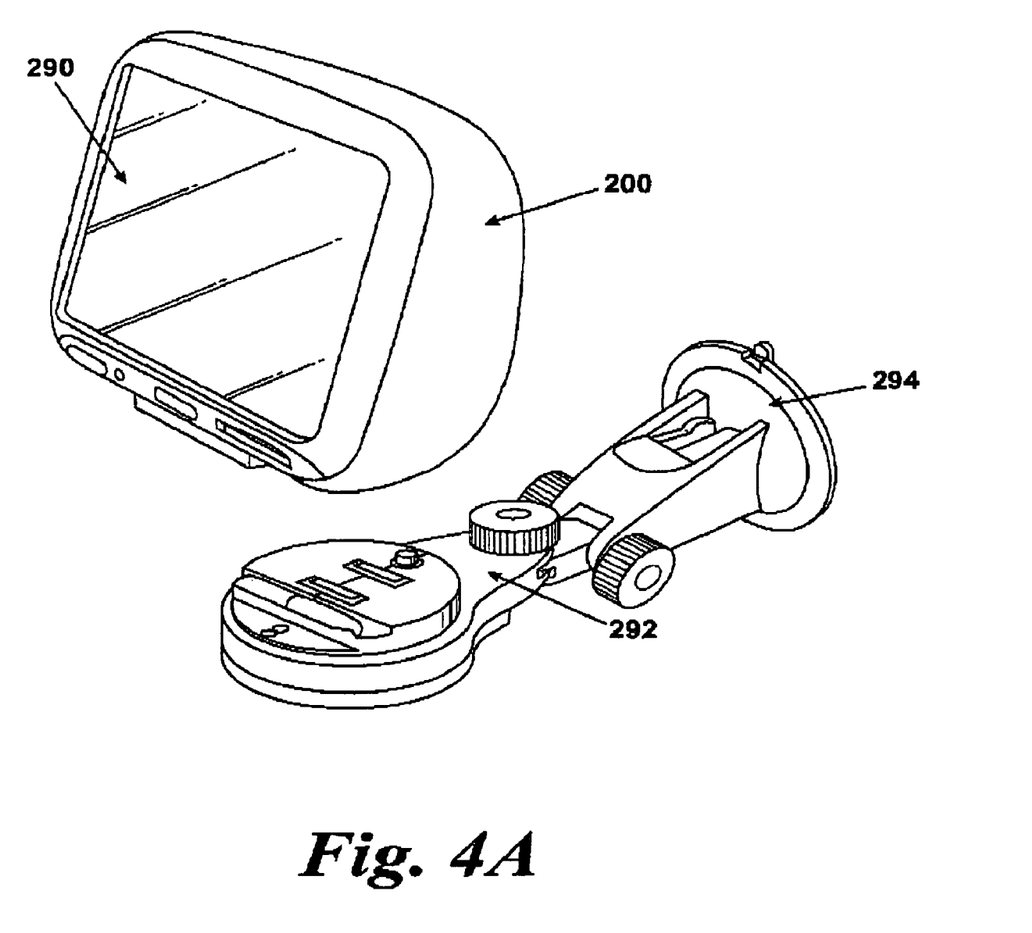
FIG. 4A illustrates a perspective view of a navigation device separated from an arm of a docking station.
Figure 4B:
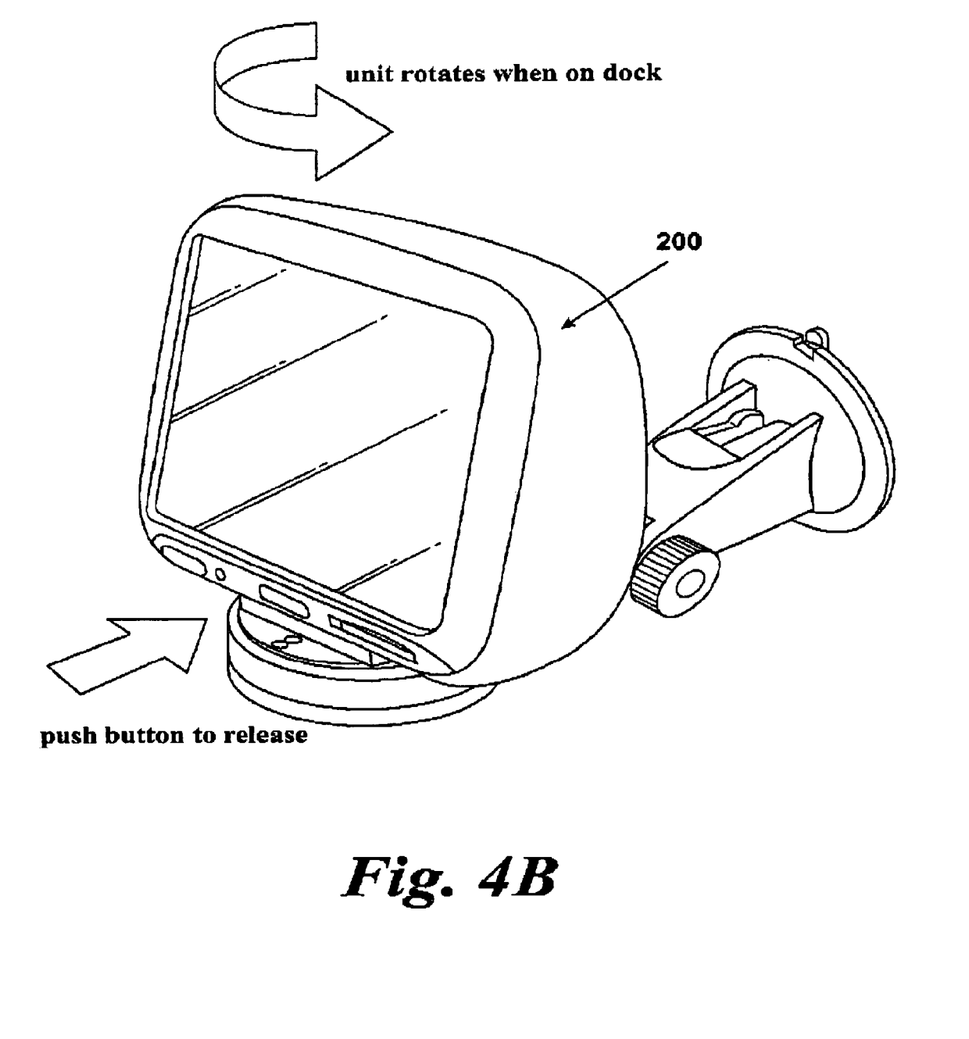
FIG. 4B illustrates a perspective view of a navigation device connected to the arm of the docking station.

FIGS. 4A and 4B are perspective views of an actual implementation of an embodiment of the navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 220, etc.).

The navigation device 200 may sit on an arm 292, which itself may be secured to a vehicle dashboard/window/etc. using a large suction cup 294. This arm 292 is one example of a docking station to which the navigation device 200 can be docked. As shown in FIG. 4B, the navigation device 200 can be docked or otherwise connected to an arm 292 of the docking station by snap connecting the navigation device 292 to the arm 292 for example (this is only one example, as other known alternatives for connection to a docking station are within the scope of the present application). The navigation device 200 may then be rotatable on the arm 292, as shown by the arrow of FIG. 4B. To release the connection between the navigation device 200 and the docking station, a button on the navigation device 200 may be pressed, for example (this is only one example, as other known alternatives for disconnection to a docking station are within the scope of the present application).

According to embodiments of the present application, a navigation device includes a receiver to determine a signal strength of a traffic message channel at a location, a memory to store information representing the signal strength of a traffic message channel, and at least one processor to correlate the information stored in memory to compile a traffic message channel resource and select a traffic message channel based on the traffic message channel resource and a location associated with a navigation device.

According to embodiments of the present application, a navigation device includes an input device to receive information relating to multiple traffic message channels from each traffic message channel providers and a processor to create a traffic message channel resource from the information. The traffic message channel resource designates at least one preferred traffic message channel for multiple locations in a coverage area.

According to embodiments of the present application, a method includes determining a signal strength of a traffic message channel at a location, storing information representing the signal strength of a traffic message channel, correlating the information stored in memory to compile a traffic message channel resource; and selecting a traffic message channel based on the traffic message channel resource and a location associated with a navigation device.

According to embodiments of the present application, a method includes receiving information relating to multiple traffic message channels from each traffic message channel providers, and creating a traffic message channel resource from the information. The traffic message channel resource designates at least one preferred traffic message channel for multiple locations in a coverage area.

According to embodiments of the present application, a navigation device includes means for measuring a signal strength of a traffic message channel, means for storing a value representing the signal strength of a traffic message channel at the location of a navigation device, means for correlating the information stored in memory to compile a traffic message channel resource, and means for selecting a traffic message channel based on the traffic message channel resource and a current location of a navigation device.

According to embodiments of the present application, a navigation device includes means for receiving information relating to multiple traffic message channels from each traffic message channel providers and means for creating a traffic message channel resource from the information. The traffic message channel resource designates at least one preferred traffic message channel for multiple locations in a coverage area.

Figure 5:
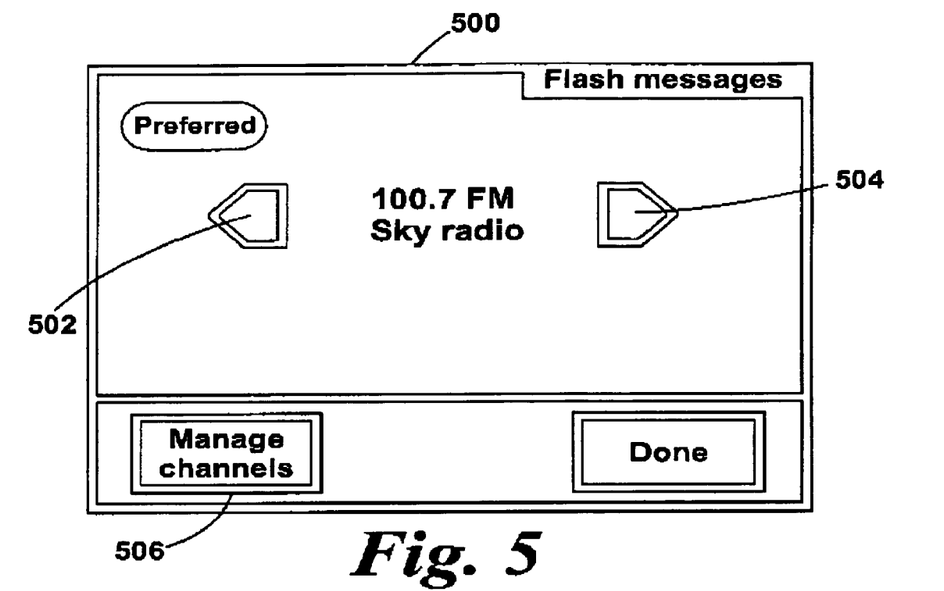
FIG. 5 illustrates example display for a user to indicate a frequency.

According to another aspect of the present application, a navigation device 200 includes a receiver 322 for receiving multiple traffic message channels. A traffic message channel provides traffic and/or travel information. The navigation device 200 also includes an input device 220 to receive a user input indicating a frequency. An example display for indicating a frequency is shown in FIG. 5 and generally referenced 500. Example display 500 is displayed on the navigation device 200. The user indicates, using arrows 502 and 504, a starting frequency for the navigation device 200 to select a traffic message channel. The frequency can be any frequency within the band in which the navigation device 200 operates. The frequency may or may not be a frequency associated with a traffic message channel.

The navigation device 200 includes a processor 210 to select a traffic message channel based on a signal strength, starting with the indicated frequency. After receiving the indicated frequency, the processor 210 included in the navigation device 200 evaluates the signal strength of the indicated frequency. If no traffic message channel is associated with the indicated frequency or the signal strength is too weak, the processor 210 tunes to the next frequency at which a traffic message channel is available. The process continues until the processor 210 selects a traffic message channel with sufficient signal strength. Accordingly, the selected traffic message channel is not necessarily the strongest signal available to the navigation device 200.

It should be noted that each of the aforementioned aspects of an embodiment of the present application have been described with regard to the navigation device 200 of the present application. However, at least one embodiment of the present application is directed to a method for selecting a traffic message channel. The method includes receiving multiple traffic message channels, receiving a user input indicating a frequency, and selecting a traffic message channel based on a signal strength, starting with the indicated frequency. Such a method can be used in one or more implementations of a navigation device 200, as would be understood by one of ordinary skill in the art. Thus, further explanation is omitted for the sake of brevity.

In another embodiment of the present application, a processor 210 included in a navigation device 200 can select a traffic message channel based on a planned route, starting with the indicated frequency. In some applications of at least one embodiment, the receiver 322/250 to receive multiple traffic channels provides the processor 210 with additional information in selecting a traffic message channel. In one example, the processor can select the one of the multiple traffic message channels based on a current location of a user along the planned route. The processor selects the traffic message channel based on the indicated frequency, the current location of the user, and information included in the navigation device 200 regarding traffic message channels. As such, the navigation device 200 can select a traffic message channel without measuring the signal strength of one or more traffic message channels.

In other implementations, a receiver 250 can be integrated with other components of the navigation device, such as processor 210, as shown in FIG. 2. The receiver 250 includes a traffic message channel antenna internal to the navigation device 200, as shown. In one implementation of at least one embodiment, an antenna included in receiver 250 can extend beyond the navigation device 200. Accordingly, the antenna can be mounted to an automobile window or a different location to maximize reception of a traffic message channel depending on the particular implementation of the navigation device 200. In other implementations, a traffic message channel antenna/receiver 250 can be a modular addition to a navigation device 200 such that the traffic message channel antenna/receiver can be acquired separately from a navigation device 200. The modular traffic message channel antenna/receiver can subsequently be incorporated or installed into the navigation device 200.

In another example, the processor 210 can select the one of the multiple traffic message channels based on an expected signal strength along the planned route. If the navigation device 200 includes information associated with the multiple traffic message channels, the navigation device 200 can predict the signal strength of a traffic message channel along a planned route. By selecting a traffic message channel based on this information, the navigation device 200 can select a traffic message channel to minimize the number of traffic message channel changes along a planned route.

Figure 6:
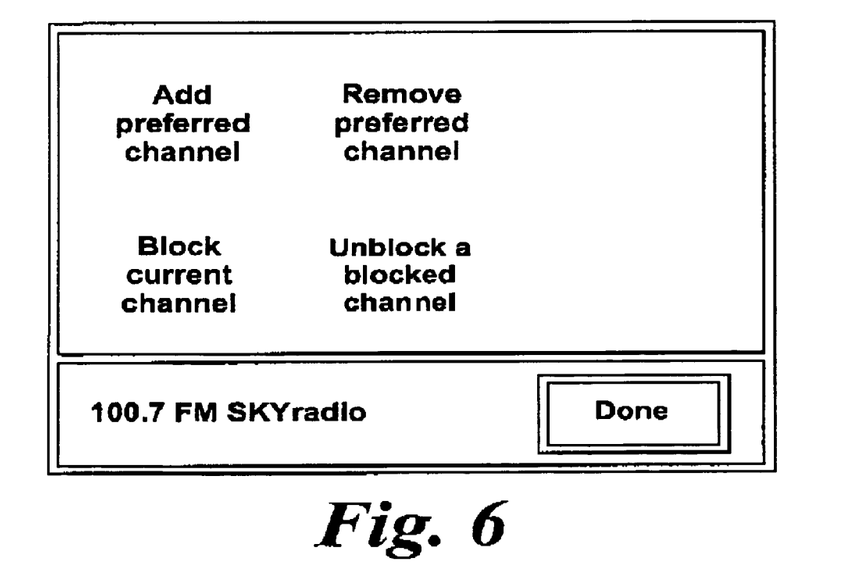
FIG. 6 illustrates example display for managing a traffic message channel.

Example display 500 also includes an input option to manage traffic message channels. When the navigation device 200 receives an input to manage channels, the navigation device 200 displays example display 600, as shown in FIG. 6. Example display 600 illustrates options available to a user of the navigation device 200 to manage traffic message channels. Managing the traffic message channel includes designating at least one traffic message channel as preferred or blocked. When a channel is designated preferred, the user may have determined the preferred traffic message channel provides better information or more relevant information to the user's particular preferences. In one implementation of at least one embodiment, the processor 210 can select the one of the multiple traffic message channels based on at least the designation. The designation can be either preferred or blocked. For example, a processor 210 can select a frequency associated with a preferred traffic channel. Additional other designations may be incorporated in other implementations. For example, a designation may include a degree of preferred, such that a processor 210 can select one preferred traffic message channel over another preferred traffic message channel.

Figure 7:
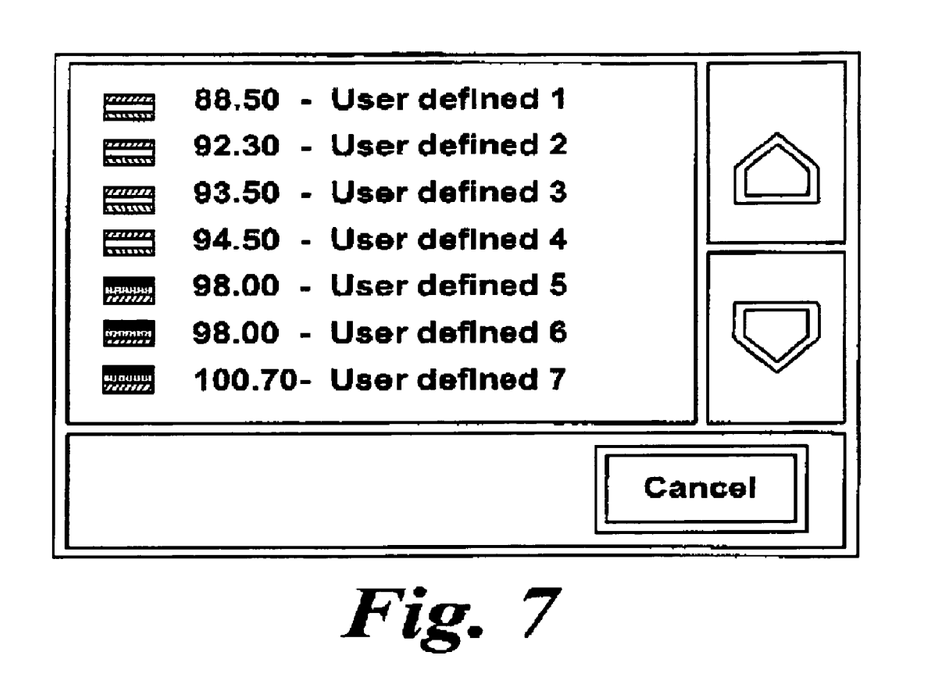
FIG. 7 illustrates example display for viewing preferred and/or blocked traffic message channels.

In further reference to example display 600, a user can remove a designation of a traffic message channel by providing an input to either remove a preferred channel or unblock a blocked channel. In response to the input, the navigation device 200 displays example display 700, as shown in FIG. 700. The example display 700 allows the user to scroll up/down to view the preferred/blocked traffic message channels. As shown in FIG. 700, each entry of a preferred/blocked traffic message channel can include a user defined name, description and/or a country designator, such as a flag, as shown. The user can select one of the traffic message channels to undesignate the traffic message channel. In response to the user input, the navigation device 200 removes the designation of the traffic message channel.

Figure 8:
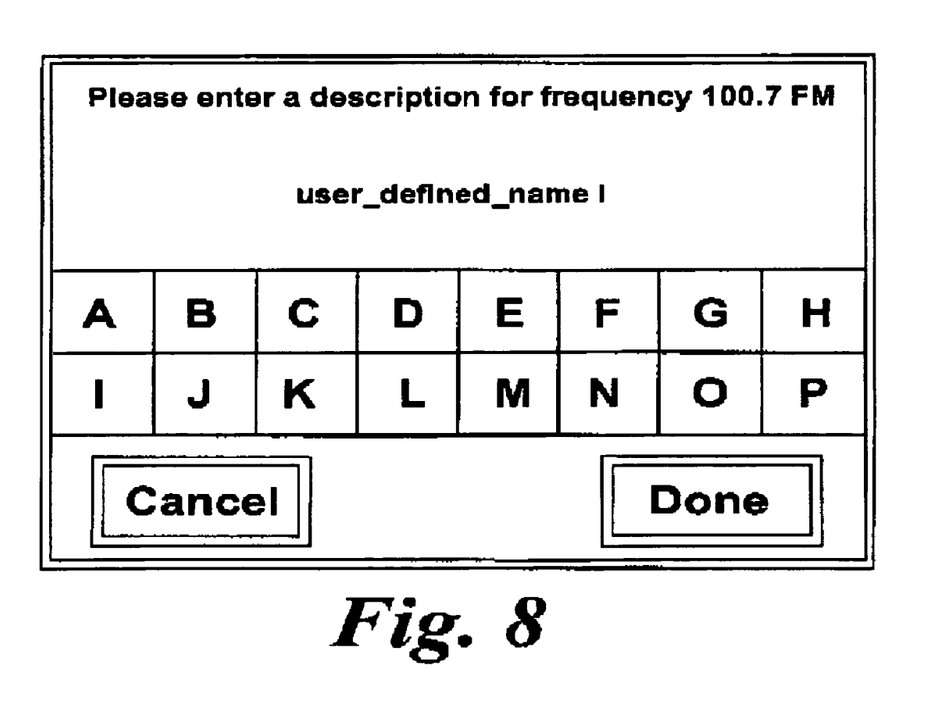
FIG. 8 illustrates an example display for defining a name for a traffic message channel.

In some embodiments of the present application, a display device 240 can be included in a navigation device 200 to display information about a traffic message channel selected by a processor 210. For example, a display device 240 can display a name associated with the selected traffic message channel. As shown in example display 500, the name of the traffic message channel is Sky radio. Displaying the name of a traffic message channel is one aspect of at least one embodiment, because the name associated with a traffic message channel is often easier to remember and recall than a frequency of a traffic message channel. The name of the traffic message channel can be provided to the navigation device 200 from the user or via the traffic message channel. In one example, a navigation device 200 includes an input device 220 to receive an input indicating a name to a traffic message channel. Example display 800 illustrated an input keyboard for a user to type in the name of a traffic message channel. The name is stored in memory 230 associated with the navigation device 200. When the channel is selected, the navigation device 200 displays the name of the traffic message channel as entered by the user on a display device 240. As illustrated in example display 800, the input device 220 and the display device 240 can be included in an integrate input and display device 290.

In another example, the name is extracted from the traffic messages received from the traffic message channel. When the selected traffic message traffic channel provides multiple traffic messages, each traffic message includes multiple segments. The processor 210 determines the name of the selected traffic message based on a number of like segments in multiple traffic messages received via the receiver. In other words, a traffic message channel includes its name in a segment of each traffic message sent. The processor 210 increments a counter for each like segment. Because the name is included in most and/or every traffic message, the corresponding counter will have the highest value after an interval. Accordingly, the processor 210 determines the name of the traffic message channel based on the counters, the segment with the highest count being associated with the name of the traffic message channel.

In another implementation of at least one embodiment, a navigation device 200 can use a counter to select a different traffic message channel. As stated above, traffic message channels send multiple traffic messages. Generally, as traffic or travel information is updated, additional traffic messages are sent. A processor 210 included in a navigation device 200 increments a counter for each traffic message received. As multiple traffic messages are received the value in the counter grows. Also, the processor 210 decrements the counter for each interval in which no traffic message is received. The processor can also decrement the counter at the interval if a traffic message is received. When the counter reaches a value, the processor 210 selects a different traffic message channel. The value can be any value depending on the implementation of the navigation device 200. For example, the value can be zero. The processor essentially prevents the navigation device 200 from being stuck on a traffic message channel that is not transmitting traffic messages.

In one example, a counter can be incremented by '1' for each traffic message received, and the counter can also be decremented by '1' every two seconds. The counter is set to a value of 60 when a traffic message channel is selected, and the maximum value of the counter is one hundred (100). If no traffic messages are received, the counter will reach zero in two minutes, causing the processor to select a different channel. If the traffic message channel provides ten messages in five seconds, the counter will be incremented by ten and decremented by five, leaving the counter at 65. And, so on. The counter will continue incrementing/decrementing until a value is reached and a different traffic message channel is selected. Again, the counter continually ensures a navigation device 200 does not become stuck on a traffic message channel providing little or not traffic or travel information. In another example, the processor 210 can compare the traffic messages received from a traffic message channel. If the traffic messages are the same, the processor may not increment the counter; i.e. receiving the same information over and over is essentially receiving no information. If the traffic message continues to be redundant, the processor 210 will eventually select a different traffic message channel.

A traffic message channel generally provides information in a uniform standard. In one implementation of at least one embodiment, a navigation device 200 receives traffic messages from a traffic message channel according to a radio data system (RDS) standard. In another implementation of at least one embodiment, a navigation device 200 receives traffic messages from a traffic message channel according to a radio broadcast data system (RBDS) standard. In still other implementation of at least one embodiment, other systems/standards can be included such as DAB, SDARS, GPRS, etc.

According to another aspect of the present application, a navigation system for selecting a traffic message channel includes a receiver 322 to determine a signal strength of a traffic message channel at least one location and a memory 230 to store information representing the signal strength of a traffic message channel. The navigation system also includes at least one processor to correlate the information stored in memory 230 to compile a traffic message channel resource and select a traffic message channel based on the traffic message channel resource and a location associated with a navigation device 200. As the amount of correlated information increases, the traffic message resource becomes increasingly useful as a basis for the at least one processor to select the traffic message channel.

It should be noted that each of the aforementioned aspects of an embodiment of the present application have been described with regard to the navigation device 200 of the present application. However, at least one embodiment of the present application is directed to a method for selecting a traffic message channel. The method includes determining a signal strength of a traffic message channel at a location, storing information representing the signal strength of a traffic message channel, correlating the information stored in memory to compile a traffic message channel resource, and selecting a traffic message channel based on the traffic message channel resource and a location associated with a navigation device 200. Such a method can be used in one or more implementations of a navigation device 200, as would be understood by one of ordinary skill in the art. Thus, further explanation is omitted for the sake of brevity.

In one implementation of at least one embodiment, the at least one processor can be a first processor to correlate information stored in memory to compile the traffic message channel resource. The at least one processor can also be a second processor to select a traffic message channel based on the traffic message channel resource and a current location of a navigation device 200. The first processor and second processor can be the same processor 210 in a navigation device 200. In another embodiment, the first processor can be a processor 304 included in a central system 302, and the second processor can be a processor 210 included in a navigation device 200. In other embodiments, the first processor and second processor can be included in another device of the navigation system. For example, a first processor can be included in a first navigation device, and the second device can be included in a second navigation device.

The at least one processor selects a traffic message channel based on a location associated with a navigation device 200. The location can be a number of locations. In one implementation of at least one embodiment, the location is a current location of a navigation device 200. The traffic message channel resource and the current location of the navigation device 200 allow the processor to select a traffic message signal without measuring a signal strength of the selected traffic message channel. The navigation device 200 can also measure the signal strength of the traffic message channel and/or provide a traffic message counter, as described above. In another implementation of at least one embodiment, the location associated with the navigation device 200 can be an expected location of a navigation device 200. The expected location can be used to select a traffic message channel to, among other things, minimize traffic message channel changes along a planned route.

The at least one processor may also select a traffic message channel based on one or more of a radio station location, a radio station coverage, a planned route, information provided by another navigation device user, and information provided by the traffic message channel. A traffic message channel is broadcast from a radio station. A location and a coverage of a radio station can indicate, without measuring, a sufficient signal strength of a traffic message channel. This information and other relevant information can be provided by the traffic message channel provider. Other information may include a PI-code, a country code, a service provider ID, an AF supplied in RDS and/or TMC channel, an access rights, a subscription, a price associated with a traffic message channel, a message geographical scope, etc. Additionally, a user of a navigation device 200 can provide information, such as measured signal strengths at particular locations.

According to another aspect of the present application, a navigation system for providing a traffic message channel resource includes an input device to receive information relating to multiple traffic message channels from each traffic message channel provider and a processor to create a traffic message channel resource from the information. The traffic message channel resource designates at least one preferred traffic message channel for multiple locations in a coverage area.

It should be noted that each of the aforementioned aspects of an embodiment of the present application have been described with regard to the navigation device 200 of the present application. However, at least one embodiment of the present application is directed to a method for providing a traffic message channel resource. The method includes receiving information relating to multiple traffic message channels from each traffic message channel provider, and creating a traffic message channel resource from the information. The traffic message channel resource designates at least one preferred traffic message channel for multiple locations in a coverage area. Such a method can be used in one or more implementations of a navigation device 200, as would be understood by one of ordinary skill in the art. Thus, further explanation is omitted for the sake of brevity.

The traffic message resource is created from the information about the multiple traffic message channels. As the amount of information increases, the traffic message resource becomes increasingly useful to a user of a navigation device 200 included in the navigation system. The navigation device 200 can select a traffic message channel based on the traffic message channel resource and one of a current location and a location associated with the navigation device 200, such as a planned route described above.

Based on the information provided, the traffic message channel resource designates at least one traffic message channel as preferred. Designating the traffic message channel as preferred can be based on at least one of a radio station location, a radio station coverage, a planned route, and information provided by a user of a navigation device 200. Any of these types of information can be used singly or in combination in a number of implementations. Also, a particular implementation may depend on one type of information over another. For example, a traffic message channel resource based on radio station location may have little or no use for information related to a planned route of a user. In another implementation of at least one embodiment, a user of a navigation device 200 can also designate at least one traffic channel as one of preferred and blocked. The designation can even be provided by a user of a different navigation device 200.

In one implementation of at least one embodiment, a navigation system can provide the traffic message channel resource to at least one user. In such an implementation, the traffic message channel resource would be correlated by a central system 302. A user of the navigation system is a user of a navigation device 200. The navigation device 200 utilizes the traffic message channel resource provided by the central system 302 to select a traffic message channel. For example, the navigation device 200 can select a traffic message channel based on the traffic message channel resource and the user's location within the coverage area. The navigation system can provide the traffic message channel resource as an optional feature to the user of a navigation device 200. As an additional feature, the traffic message channel resource can be updated at regular intervals, e.g. monthly or semi-annually.

In another implementation of at least one embodiment, the navigation system can include a navigation device 200 which includes the input device to receive information and the processor 210 to create a traffic message channel resource from the information. The creation of the traffic message resource on a navigation device 200 allows the user to customize the traffic message channel resource. The user can provide any of the information disclosed above, such as a user designation or a radio station coverage, from which the traffic message channel resource is created.

The methods of at least one embodiment expressed above may be implemented as a computer data signal embodied in the carrier wave or propagated signal that represents a sequence of instructions which, when executed by a processor (such as processor 304 of server 302, and/or processor 210 of navigation device 200 for example) causes the processor to perform a respective method. In at least one other embodiment, at least one method provided above may be implemented above as a set of instructions contained on a computer readable or computer accessible medium, such as one of the memory devices previously described, for example, to perform the respective method when executed by a processor or other computer device. In varying embodiments, the medium may be a magnetic medium, electronic medium, optical medium, etc.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

As one of ordinary skill in the art will understand upon reading the disclosure, the electronic components of the navigation device 200 and/or the components of the server 302 can be embodied as computer hardware circuitry or as a computer readable program, or as a combination of both.

The system and method of embodiments of the present application include software operative on the processor to perform at least one of the methods according to the teachings of the present application. One of ordinary skill in the art will understand, upon reading and comprehending this disclosure, the manner in which a software program can be launched from a computer readable medium in a computer based system to execute the functions found in the software program. One of ordinary skill in the art will further understand the various programming languages which may be employed to create a software program designed to implement and perform at least one of the methods of the present application.

The programs can be structured in an object-orientation using an object-oriented language including but not limited to JAVA, Smalltalk, C++, etc., and the programs can be structured in a procedural-orientation using a procedural language including but not limited to COBOL, C, etc. The software components can communicate in any number of ways that are well known to those of ordinary skill in the art, including but not limited to by application of program interfaces (API), interprocess communication techniques, including but not limited to report procedure call (RPC), common object request broker architecture (CORBA), Component Object Model (COM), Distributed Component Object Model (DCOM), Distributed System Object Model (DSOM), and Remote Method Invocation (RMI). However, as will be appreciated by one of ordinary skill in the art upon reading the present application disclosure, the teachings of the present application are not limited to a particular programming language or environment.

The above systems, devices, and methods have been described by way of example and not by way of limitation with respect to improving accuracy, processor speed, and ease of user interaction, etc. with a navigation device 200.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A navigation system for selecting a traffic message channel, the navigation system comprising:
    a receiver to determine a signal strength of a traffic message channel at a location;
    a memory to store information representing the signal strength of the traffic message channel; and
    at least one processor to correlate the information stored in memory to compile a traffic message channel resource and select a traffic message channel based on the traffic message channel resource and a location associated with a navigation device.

2. The navigation system of claim 1 wherein a first processor correlates the information stored in memory to compile the traffic message channel resource and a second processor selects a traffic message channel based on the traffic message channel resource and the location associated with a navigation device.

3. The navigation system of claim 2 wherein the first processor is included in a central system and the second processor is included in a navigation device.

4. The navigation system of claim 1 wherein the at least one processor is included in the navigation device.

5. The navigation system of claim 1 wherein the location associated with a navigation device is a current location of the navigation device.

6. The navigation system of claim 1 wherein the location associated with a navigation device is an expected location of the navigation device.

7. The navigation system of claim 1 wherein the traffic message channel resource designates a traffic message channel as preferred.

8. The navigation system of claim 7 wherein the traffic message channel resource designates a preferred traffic message channel is based on at least one of a radio station location, a radio station coverage, a planned route, information provided by a user of a navigation device, and information provided by the traffic message channel provider.

9. The navigation system of claim 1 wherein the selected traffic message channel is based on at least one of a radio station location, a radio station coverage, a planned route, information provided by another navigation device user, and information provided by the traffic message channel provider.

10. A method for selecting a traffic message channel, the navigation system comprising:
    determining a signal strength of a traffic message channel at a location;
    storing information representing the signal strength of the traffic message channel;
    correlating the information stored in memory to compile a traffic message channel resource; and
    selecting a traffic message channel based on the traffic message channel resource and a location associated with a navigation device.

11. The method of claim 10 wherein the location associated with a navigation device is an expected location of the navigation device.

12. A navigation device to perform the method of claim 10.

13. A navigation system for selecting a traffic message channel, the navigation system comprising:
    means for measuring a signal strength of a traffic message channel;
    means for storing information representing the signal strength of the traffic message channel at the location of a navigation device;
    means for correlating the information stored in memory to compile a traffic message channel resource; and
    means for selecting a traffic message channel based on the traffic message channel resource and a current location of a navigation device.

14. The navigation system of claim 13 wherein the means for correlating is included in a central system and the means for selecting is included in a navigation device..

* * * * *